Sept. 22, 1936.  F. A. KING  2,054,823
FISHING REEL
Filed July 1, 1935
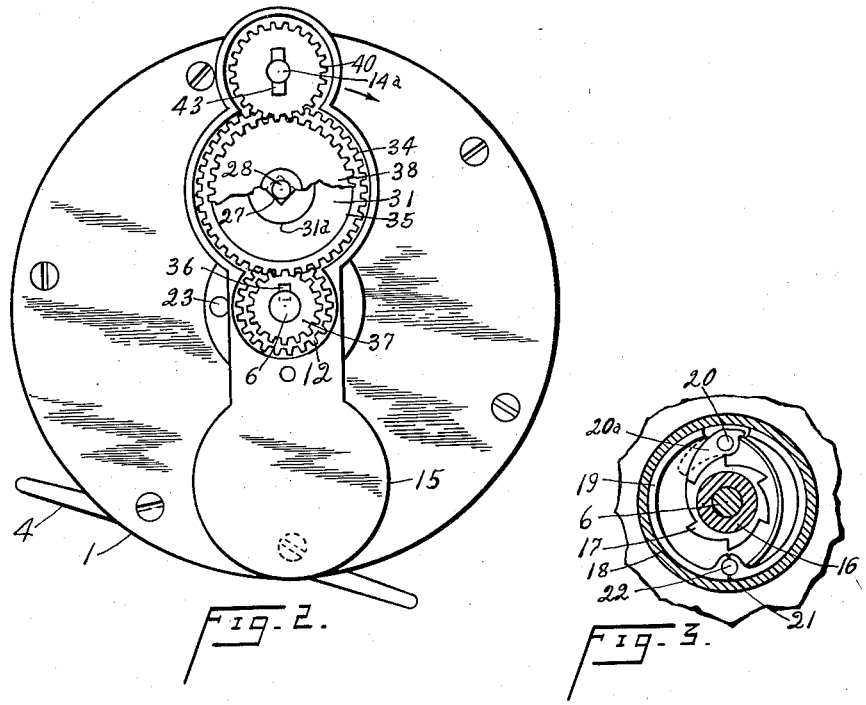
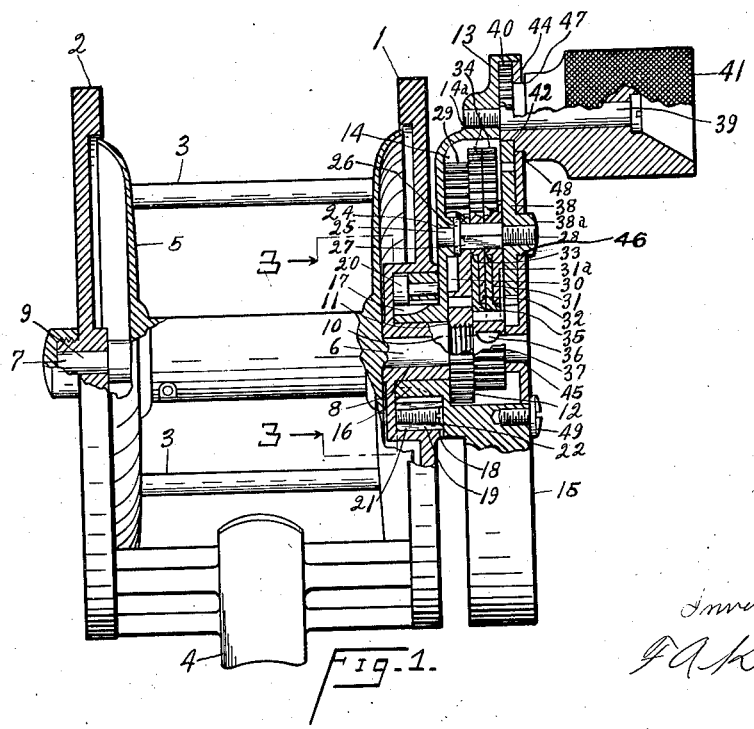

Patented Sept. 22, 1936

2,054,823

UNITED STATES PATENT OFFICE 2,054,823

FISHING REEL

Frank A. King, Los Angeles, Calif.

Application July 1, 1935, Serial No. 29,249

13 Claims. (Cl. 242—84.5)

This invention relates to drag and free spool fishing reels, and more particularly to line tension controlling mechanism for fish line reels of a type, comprising a winding crank, including compound gearing and a spool gear journaled therein. The crank is provided with a turnable gripping handle or knob which is both capable of driving the crank and independently adjusting the drag mechanism irrespective of rotation or position of the crank.

It is an object of this invention to provide the crank with compound gearing, which is engaged with a stationary gear and the spool gear. Such gearing is carried by the crank in a planetary or epicyclic manner about the last two mentioned gears.

It is another object of this invention to provide the gearing with a novel drag construction including split or multiple gears of equal diameter each having an inner web which serves as a drag disk, located between complementary disks, carried upon a drive shaft, thus comprising a clutch drag of fewer parts and ample frictional surface.

Heretofore fishing reels have been provided with a star or pilot wheel member concentrically mounted on the winding crank, for adjusting the drag mechanism. Such members are usually formed to conform with the limited and awkward space in which they are mounted. Since due to the central location and the form of such member it is necessary for the angler to change the position of his hand and straddle finger the handle or the crank in making adjustments of said member, which the angler sometimes attempts to do with but one finger, the resultant being an over tensioned drag and a broken line.

It is therefore the broad object of this invention to overcome the above mentioned objections by providing novel construction such as a turnable handle or grip, which is capable of both driving the crank and adjusting the drag mechanism either simultaneously or independently, thus permitting a circumferential hand grip on the drag adjusting element or grip.

It is another important object of this invention to provide the gearing in the drag mechanism with gear ratios commensurate with the ratio of the spool driving gears, thus causing neutral rotation of the grip, which coacts with the operator's hand grip.

Obviously such construction affords the advantage of placing the line tension controlling element constantly within the angler's grip, thus permitting a sensitive instantaneous control of the line tension mechanism.

Another object of this invention resides in the novel construction of a friction pawl carrier adapted to yieldably permit retroactive movement of the crank, thus serving as a safety means to prevent breaking of the line and at the same time providing a highly sensitive means for indicating the pull of the fish.

Further objects and advantages will appear from the following detail description when taken in connection with the accompanying drawing, it being expressly understood, however, that the drawing is designed for the purpose of illustrating only and not as a definition of the limits of this invention, reference being had to the appending claims for this purpose.

In the drawing, like reference characters designate similar parts in the several views.

Fig. 1 represents a front elevation, parts being broken away to show a longitudinal cross section of the line controlling mechanism.

Fig. 2 is a side elevation, certain parts being removed to show the drive and clutch gearing.

Fig. 3 is a cross sectional view taken on line 3—3 of Fig. 1 showing the friction pawl carrier.

The present invention is shown as including a frame consisting of the conventional type head and tail members 1 and 2, connected by pillars 3 and the reel seat member 4.

A spool 5 of conventional design is provided at its axis with trunnions 6 and 7 and it is centrally journaled in and between members 1 and 2, in suitable bearings 8 and 9 respectively.

The mechanism which constitutes the line tension controlling mechanism of this invention is more particularly characterized as follows:

The bearing 8 is formed integral with member 1 and in the hollow of a boss 10, its outer end is slightly reduced in diameter and screw threaded thus forming a shoulder 11. Abutting this shoulder and engaging the threads thereon is an internally threaded stationary gear 12.

I provide a special crank 13 which is provided at one end with a gear box 14 and at the opposite end is an integral counterweight 15. Intermediate the counter-weight and the box the crank is formed with a hollow hub portion 16 which encircles the trunnion 6 and on which are provided ratchet teeth 17; the crank being rotatably held in place on the trunnion 6 by the gear 12 which when screwed on the bearing 10 will form an abutment for the inner end of the hub 16.

In this instance the member 1 is provided with an annular offset face which forms a circular recess 18, whereon is fitted a yieldable pawl carrier 19, made of suitable frictional material and cylindrical in form, which encircles the hub 16 and carries by means of pivot pin 20, a spring pressed pawl 20a, which coacts with the ratchet teeth 17 on the hub 16. Diametrically opposite the pawl 20a the carrier is provided with a transverse slot 21, which is drilled and threaded, wherein is screwed a tapered plug 22. Adjacent the hub 16 the crank 13 is provided with a cover flange formed with an aperture 23 which registers with plug 22, thus permitting access to and turning of the plug 22 to effect frictional adjustment of the carrier 19 against the internal periphery of recess 18. Such frictional tension is adjusted to a value slightly under the tensile strength of the line, thus permitting retroactive rotation of the crank, in the event that such value is exceeded by the pull of the fish. Other advantages will later be described.

The gear box 14 is formed with a bearing 24, wherein is located the inner end of a drive shaft 25, having an integral flange 26. This shaft is formed with an intermediary squared portion 27 and screw threaded at the outer end thereof as indicated at 28, preferably of the left thread. Abutting the flange 26 is a spur drive gear 29, which is provided with a recess 30, on the inner side thereof and a squared aperture and it is united with shaft 25 by a press fit on the squared portion 27.

In this instance the squared portion 27 carries a series of multiple disks 31 and 32, which are provided with inwardly projecting circular hubs 33. These hubs are also provided with squared apertures which freely slide over the squared portion 27.

Alternately interposed with respect to disks 31 and 32 is a plurality of disk gears 34 which are each provided with circular recesses 35 and apertures adapted to rotatably fit over the hubs 33 and the periphery of disks 31 and 32.

Mounted and keyed by key 36 is a driven spool gear 37 which is in mesh with the disk gears 34. Preferably the disk gears are made of fiber or other suitable frictional material and the disks 31 and 32 are made of suitable metal.

A drag adjusting gear 38 having an internally threaded hub 38a is engaged with screw threads 28, on the drive shaft. This gear abuts the outer face of a hub 31a which is formed on the disk 31, and it will be noted, however, that relative rotation of the adjusting gear through the medium of its screw threaded engagement with the drive shaft 25 will compress the disks 31 and 32 and the disk gears 34 thus increasing their frictional contact sufficiently to unite the latter with drive gear 29 thus forming a compound gear.

It will be obvious that the teeth of disk gears 34 are free to shift longitudinally on the driven or spool gear 37, thus eliminating the use of numerous parts such as fiber washer and metal disks and the expense of machining keyways or grooves, yet providing an extremely compact and effective drag mechanism.

It is to be understood that rotation of the crank in the direction indicated by the arrow in Fig. 2 will rotate the drive gear 29 around the stationary gear 12 thus rotating gearing 29, shaft 25, gears 34 and the spool gear 37 thus driving the spool 5 in a reverse direction.

At the radially outer end of gear box 14 the crank is transversely drilled and threaded as indicated at 14a wherein is screwed a headed crank pin screw 39, on which is rotatably mounted a spur gear 40 and a knurled grip 41, the inner end of which grip 41 has lugs 42 machined thereon. Such lugs are drivably engaged with a corresponding aperture 43 in the gear 40 as shown in Fig. 2. The latter gear being in mesh with the drag adjusting gear 38 and connected to the grip by the lug 42, it is therefore obvious, that a right turn of the grip 41 will act through gear 40 to turn gear 38 to the left on the left threads 28 to engage the disks 31 and 32 with the gears 34, thus forming a driving connection between the crank and the spool, for driving the spool.

A cover 44 is provided with apertures 45 and 46 which are adapted to fit over the trunnion 6 and the hub 38a respectively; it also having an opening at 47 wherein is inserted a reduced shouldered end 48, of grip 41. The periphery of the cover is formed to conform with the internal periphery of the gear box 14 and it is secured therein by the shouldered end 48 and a screw 49 which is threaded in the face of the crank, thus providing an outer bearing for the hub 38a and the drive shaft 25.

The operation of this invention is as follows:

The stationary gear 12 and the grip gear 40 are of the same pitch diameter and the drive gear 29 and the drag adjusting gear 38 are also of the same pitch diameter; therefore, assuming the drag to be engaged as stated, and the angler in the act of cranking in the line, gears 29 and 38 being united by the drag function to drive the spool; yet idly rotate with respect to gear 40, thus tending to effect non-rotative movement of gear 40 and the grip 41 which cooperate with the angler's hand grip.

Obviously an efficient free spool is provided for paying out the line by turning the grip 41 to the left to act through gear 40 to turn gear 38 to the right on the left threads 28 to free the disks 31 and 32 and gears 34 relative to each other thus permitting free rotation of gear 37 and the spool in the unwinding direction.

In the event of a catch as the line is being played out and at which time the line is rapidly unwound from the spool by the fish, the drag friction is increased by a right hand turn of the grip, the result of which will be noted by a retroactive movement of the crank and its ratchet teeth 17 striking against the pawl 20a. If the drag friction is then further increased to a value exceeding the frictional resistance of the pawl carrier, the unwinding movement of the spool will act through the drag mechanism including gears 34, shaft 25 and gear 29, thus tending to cause the latter to travel around the fixed gear 12, with resultant turning of the crank in its retrograde direction, this movement of course depending upon the amount of manual resistance offered by the angler to restrain such movement or release the drag. This tendency of the crank to rotate in retrograde direction serves as a warning to the angler when strain on the line is excessive and indicates the necessity of releasing the drag to avoid breaking of the line.

It will therefore be obvious that in reeling in the tension of the drag may easily be gaged and instantly adjusted in accordance with the pull of the fish.

Though there has been illustrated and described only one embodiment, it is to be understood that the invention is not limited thereto but may be capable of expression in various forms. It is also to be understood that any suitable drag mechanism may be associated with the spool and controlled by the grip through the intermediary of the crank. Various other changes in the details of construction and arrangement of the component parts of the structure may be resorted to without departing from the spirit of the invention as defined in the appending claims.

What I claim is:

1. In a grip drag control fishing reel, a head member, a spool journaled in said member, a crank rotatable on said member, a turnable grip associated with said crank, compound gears carried by said crank and engaged with said member and the spool, drag mechanism associated with said compound gears and grip control means for actuating said drag mechanism to disengage and engage the spool and said compound gears.

2. In a grip drag control fishing reel, a head member, a central boss on said member, a spool journaled in said boss, a crank rotatable on said boss, a turnable grip associated with said crank, gearing carried by said crank and engaged with said member and the spool; drag mechanism associated with said gearing, and means associated with said grip and said drag mechanism for actuating the latter to disengage and engage said spool and said gearing.

3. In a grip drag control fishing reel, a head member, a central boss on said member and a spool journaled therein, a crank rotatable on said boss, a pin carried by said crank, a grip turnable on said pin, compound gearing carried by said crank and engaged with said boss and said spool; drag mechanism for placing said gearing in and out of operative relation to said spool, and means associated with said grip to adjust said drag mechanism.

4. In a grip drag control fishing reel, a head member and a spool journaled therein, a crank rotatable on said member, a turnable grip associated with said crank, a plurality of friction epicyclic gears carried by said crank, means associated with said gears drivably engaged with said spool, a series of metal drag disks associated with said gears, and means carried by said crank and engaged with said grip for actuating said disks.

5. In a grip drag control fishing reel, a head member, a central boss on said member, a spool journaled therein, a crank provided with a central hub portion and rotatably secured on said boss, ratchet teeth on said hub portion, a turnable grip associated with said crank, compound gears carried by said crank and engaged with said spool, a gear fixed on said boss, a friction drag mechanism intermediate said spool and said grip and associated with said compound gears and normally idly engaged with said grip, said member provided with a circular recess encircling said ratchet teeth, a yieldable pawl carrier frictionally supported in said recess, a spring pressed pawl pivoted on said carrier and engaged with said ratchet teeth, and means for adjusting the friction of said carrier for restraining retroactive rotation of said crank.

6. A free spool fishing reel comprising a head member having a central boss, a spool having a trunnion and a pinion fixed thereon, the trunnion journaled in said boss, a rotatable crank on said boss, a stationary gear secured to said boss, the crank provided with a gear box at one end and a counterweight at the opposite end, gearing carried in said box and cooperatively engaged with said stationary gear and said pinion for driving the spool, a friction drag mechanism associated with said gearing and provided with a gear having a pitch diameter equal to certain of said first mentioned gears, a manually operable grip carried by said crank, the grip provided with a gear having a pitch diameter equal to other of said first mentioned gears, said gears of equal pitch diameter adapted to permit neutral cranking position of said grip through the medium of said drag and said grip adapted to adjust the friction of said drag.

7. In a drag mechanism for a fishing reel having a spool, a gear fixed on the spool and a plurality of disk gears in mesh therewith for driving the spool, a shaft rotatable in said gears, a series of non-rotatable disks alternatively interposed between said disk gears, a crank, a grip on said crank, and means associated with said grip to compress said disks.

8. In a fishing reel, a head member, a spool journalled in said member, a crank carried by said head member, gear connections between said crank and spool, a drag mechanism interposed in said gear connections for placing said connections in and out of operative relation to said spool and crank; a movable grip on said crank, and means connected to said grip for controlling said drag.

9. In a fishing reel, a head member, a spool journalled in said member, a crank carried by said head member, gear connections between said crank and spool, a drag mechanism interposed in said gear connections for placing said connections in and out of operative relation to said spool and crank, a turnable grip on said crank and means connected to said grip for controlling said drag.

10. In a fishing reel a head member, a spool journalled on said member, a crank carried by said head member, gear connections between said crank and spool, a drag mechanism interposed in said gear connections for placing said gear connections in and out of operative relation to said crank and spool, a movable grip on said crank, means connected to said grip for controlling said drag mechanism, and a connection between said crank and head member permitting for rotation of said crank in a forward direction and frictionally resisting rotation of said crank in a retrograde direction.

11. The structure called for in claim 10 together with means for varying the tension of said connection.

12. In a fishing reel, a head member, a spool journalled in said member, a crank carried by said head member, driving connections between said crank and spool, a ratchet carried by said crank, a pawl engaging said ratchet, a carrier for said pawl slidably carried by said head member, and means frictionally engaging said carrier with said head member.

13. In a fishing reel, a head member, a spool journalled in said member, a crank carried by said head member, driving connections between said crank and spool, a ratchet carried by said crank, a pawl engaging said ratchet, a carrier for said pawl turnably supported on said head member, means frictionally engaging said carrier with said head member, and means for adjusting the frictional tension of said last named means.

FRANK A. KING.